Dec. 21, 1937.    R. B. GRAY ET AL    2,102,590
AIRCRAFT CONSTRUCTION
Filed Dec. 2, 1936    2 Sheets-Sheet 1

INVENTORS.
REID B. GRAY
EDWIN L. ZIVI
BY
ATTORNEY.

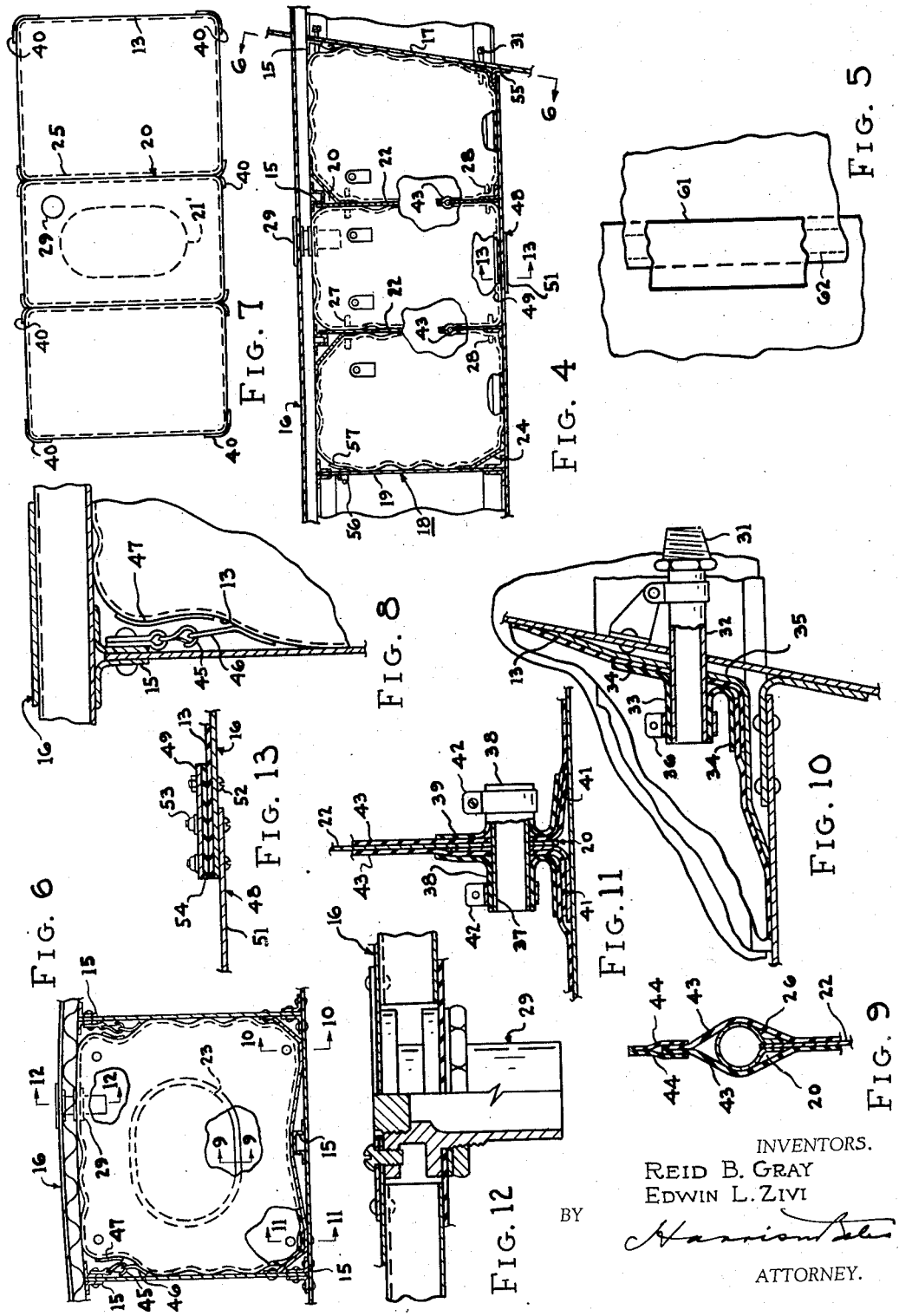

Patented Dec. 21, 1937

2,102,590

UNITED STATES PATENT OFFICE 2,102,590

AIRCRAFT CONSTRUCTION

Reid B. Gray, Dundalk, and Edwin L. Zivi, Baltimore, Md., assignors to The Glenn L. Martin Company, Baltimore, Md.

Application December 2, 1936, Serial No. 113,773

9 Claims. (Cl. 244—135)

This invention relates to containers, and particularly containers for hydrocarbon substances. In its more restricted aspect it relates to aircraft construction and more particularly to an aircraft of improved construction for supporting and accommodating a novel container.

Tanks for containing hydrocarbons such as fuel and lubricating oils, and particularly such tanks for use in airplanes, in general have presented a serious problem to the trade and various and sundry types of tanks have been proposed. All of the tanks heretofore proposed are undesirable for one or more reasons. The type of tanks now employed in the trade include a portion of the aircraft construction being formed and enclosed to provide a fuel compartment or tank and also metallic tanks which are separate from the aircraft structure and positioned within various parts of the aircraft, such as the fuselage, wing, hull, and the like.

Metallic tanks of this nature, and especially such tanks when used in aircraft, whether they are built into the aircraft structure or formed separately and supported by the structure, present many undesirable features. For instance, in the type of tank formed as a part of the aircraft structure, the seams connecting the adjacent parts of the tank ultimately become impaired to the extent of leakage of fuel through these seams or joints. These seams or joints are often impaired due to the stresses and strains under which the aircraft is subjected, such as landing, rough air, as well as weaving of the various parts during use. The separately constructed tanks are subjected to objectionable vibrations together with the ever present difficulties of constructing a metallic tank in such a manner as to prevent seepage of fuel by way of the rivets and other like means employed in the construction of the tank.

All of the metallic tanks heretofore proposed are constructed of such material, which for some reason or other corrodes within the tank. This corrosion is probably due to electrolytic or galvanic action set up by the introduction of foreign matter in the fuel. This foreign matter may be the result of improper straining of the fuel, or, possibly, condensation. Metallic tanks also present another problem in aircrafts of the fighting type, as for instance, a bombing plane may be at an altitude of some 15,000 or 20,000 feet or even much higher and for some reason or other it may be necessary to descend rapidly. In such cases the differential air pressure within the tank has been known to explode the tank. This is, of course, due to the improper venting of the tank, although sufficient venting to take care of this radical change in air pressure may present other difficulties, such as the loss of fuel during acrobatic or fighting maneuvers.

Also, whether these metallic tanks are separate or formed as a part of the aircraft structure, it is necessary to disassemble that portion of the aircraft in order to properly clean, inspect, repair, and replace such tanks.

Still another disadvantage of the metallic tanks heretofore proposed, is that when in case of a crash these tanks have a tendency to burst and throw the fuel over a large area of the plane which usually results in fire.

The invention broadly is directed to the provision of an improved container, particularly a container for hydrocarbons.

It is one object of the invention to provide an improved aircraft construction that shall overcome the above difficulties.

Another object is to provide an improved fuel or lubricating oil tank for use in an aircraft.

Another object is to provide an improved aircraft construction that shall be adapted to support and accommodate a novel flexible container.

Another object is to provide an aircraft construction having a supporting structure for a flexible container that shall permit ready removal of the flexible tank from the aircraft for cleaning, inspecting, repairing, and replacing.

Another object is to provide an improved container for use in an aircraft that shall be collapsible due to differential air pressures and which shall not burst in case it is subjected to a sudden impact or impacts.

Another object is to provide in combination with a metallic supporting structure a collapsible container that shall not corrode within and thereby maintain a container free from such foreign matter.

Another object is to provide a novel collapsible container for an aircraft that shall be light in weight, durable, impervious to the fuels for which it is adapted to be used, and comparatively cheap to manufacture.

A further object is to provide an aircraft construction having the above characteristics, wherein the said flexible container is of such novel construction that shall render it impervious to fuel, such as gasoline, lubricating oils, and the like, and which may be readily repaired in case of a puncture due to a bullet, or the like.

A still further object is to provide novel means for constructing a flexible container that shall prevent seepage of fuel through the seams connecting adjacent tank walls.

The above and other objects will be made apparent through the further description of the invention when taken in connection with the accompanying drawings, wherein like reference characters refer to like parts. It is to be distinctly understood that the herein described container is not only adapted for use with fuel and lubricating oil, but is intended to be employed for containing any fluid required in aircraft such as water and gas. The drawings are not a definition of the invention, but illustrate a manner in which the invention may be effectuated. The invention is defined by the appended claims.

In the drawings:

Figure 4 is a sectional view taken along the line 4—4 of Figure 1.

Figure 5 is a fragmentary view in elevation taken from the interior of Figure 7.

Figure 6 is a sectional view taken along the line 6—6 of Figure 4.

Figure 7 is a top plan view of a collapsible fuel tank embodying the invention.

Figure 8 is an enlarged fragmentary sectional view illustrating a detail of the invention.

Figure 9 is a sectional view taken along the line 9—9 of Figure 6.

Figure 10 is a sectional view taken along the line 10—10 of Figure 6.

Figure 11 is a sectional view taken along the line 11—11 of Figure 6.

Figure 12 is a sectional view taken along the line 12—12 of Figure 6.

Figure 13 is a sectional view taken along the line 13—13 of Figure 4.

Figure 1:
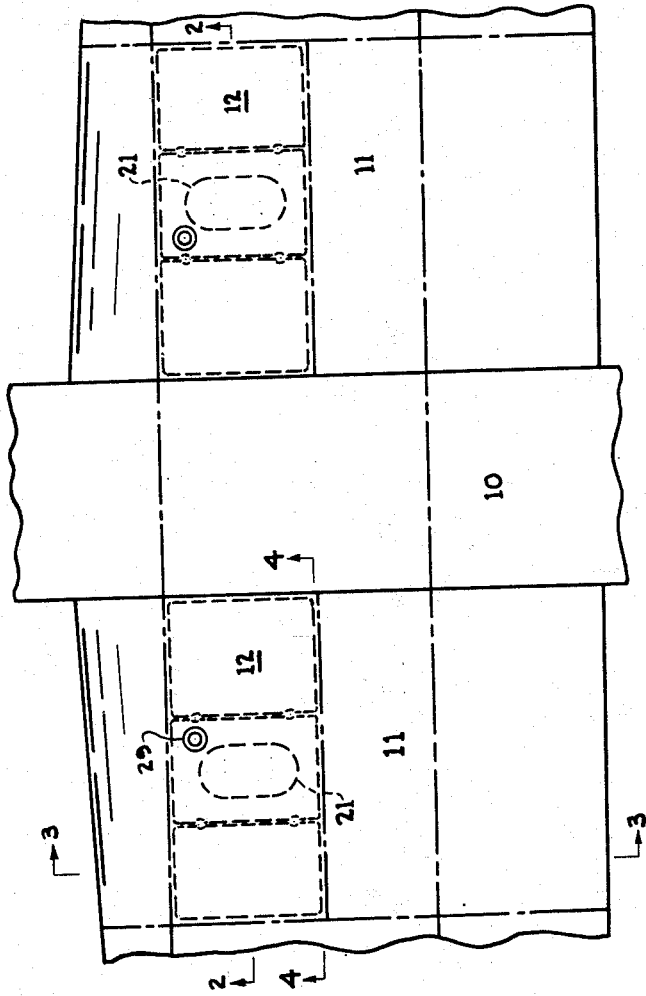
Figure 1 is a fragmentary top plan view of an aircraft illustrating one embodiment of the invention.
Figure 2:
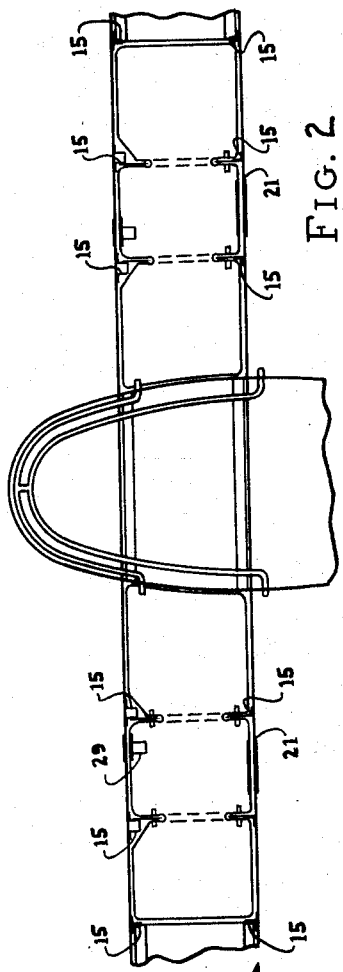
Figure 2 is a sectional view taken along the line 2—2 of Figure 1.
Figure 3:
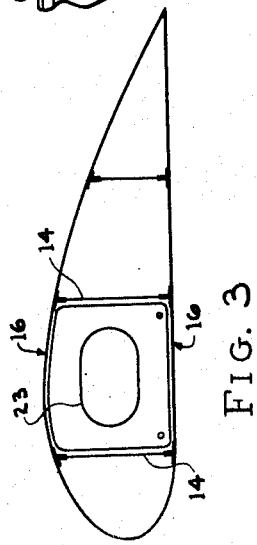
Figure 3 is a sectional view taken along the line 3—3 of Figure 1.

Referring to the drawings, 10 indicates the fuselage of a monoplane having a laterally extending wing 11. In the form shown there are illustrated two separate and like fuel containing means each represented in its entirety by 12. Each of the means 12 is, for the purpose of illustration, located in the wing structure and on opposite sides of the fuselage 10.

The means 12 comprises a collapsible leakproof inner tank 13 (see Figure 7) and the associated wing structure arranged to support the collapsible tank 13.

For the sake of simplicity and clarity the present invention is illustrated in connection with the wing structure. However, it is to be distinctly understood that the present fuel containing means 13 is equally adapted and in fact intended to be positioned in other parts of the aircraft construction, as for instance, in the fuselage of an airplane, hull or seawings of a flying boat, or any other part of the aircraft which is suitable or desirable.

In the form shown the wing 11 consists of a framework comprising conventional beams or spars 14 spaced apart and extending lengthwise of the wing. These spars are connected together by means of ribs or transverse members 15 and form a frame structure for supporting a wing covering represented in its entirety by 16.

The tank may be of such size and capacity as may be required for the particular installation and as shown, the fuel containing means 12 is located within the structure of the wing 11 and adjacent the fuselage 10. The fuel containing means 12 is positioned intermediately of the wing 11 and within the confines of the first four ribs or upper and lower transverse members 15 nearest the fuselage and the cooperating spaced spars 14. The upper and lower inner ribs 15 are connected by a partition 17, the latter serving to close this end of a supporting structure represented in its entirety by 18 for the collapsible tank 13. The web of the spars 14 constitutes the sides of the supporting structure 18 and a partition 19 connecting the upper and lower outer spars 15 provides an outer end for the supporting structure 18, the covering 16 serving as the top and the bottom of the supporting structure 18.

The bottom of the supporting structure is provided with an opening or manhole 21 and is preferably positioned to communicate with the interior of the supporting structure 18 and at a point in the center thereof, as for instance, between the second and third lower transverse members 15 nearest the fuselage 10. The manhole 21 is sufficiently large for an operator to enter for the purpose of installing the collapsible tank 13 within the supporting structure 18.

For the purpose of reducing the agitation of the fuel within the fuel containing means 12, bulkheads 22 are provided within the supporting structure 18 and preferably connected to the upper and lower transverse members 15 and defining a plurality of compartments within the supporting structure 18. These bulkheads are formed to provide an opening 23 therethrough sufficiently large to provide easy access to the several compartments from the manhole 21. The inner surfaces of the transverse members 15 as well as the associated inner surfaces of the spars 14 and the forward and rear end edges or corners of the bulkheads 22 are covered by plates 24 fixed to the adjacent inner surfaces of the supporting structure 18 and operate to protect the collapsible tank 13 from injury from these surfaces and preventing any abrasion of the inner tank 13.

The tank 13 is of novel construction and consists of a plurality of compartments corresponding to the compartments within the supporting structure 18. The tank is partitioned as shown at 25 to form corresponding bulkheads 22 of the supporting structure. The partitions 25 of the collapsible tank 13 are formed to provide grooves 20 to receive the cooperating bulkheads 22 of the supporting structure 18. The several compartments of the tank 13 are preferably constructed separately and thereafter assembled into a single unit for insertion into the supporting structure 18 by way of the manhole 21 and openings 23 within the bulkheads 22. The edges defining the openings 23 are preferably provided with a bead 26 (as best shown in Figure 9). These beads 26 operate to receive the cooperating portions of the bulkheads 25 and present a smooth round surface for eliminating wear due to friction.

It can now be understood that the collapsible tank 13 may be positioned within the tank supporting structure 18 by way of the manhole 21 and openings 23 within the bulkheads 22. Novel means is provided for supporting the tank 13 within the structure 18 and this supporting means additionally operates to vent the several compartments as well as to connect the bottoms of the adjacent compartments with one another in order to maintain a common level of the fuel within the said compartments.

This supporting means includes vents 27 disposed through the upper portion of the cooperating bulk heads 25 and 22 of the tank 13 and supporting structure 18, respectively, and as here shown the vents 27 comprise a tubular member extending through the surfaces of these cooperating bulkheads and connecting the adjacent compartments. Drains 28 positioned through the cooperating bulkheads 25 and 22 and adjacent the bottom thereof are provided for connecting the adjacent compartments and maintaining a common level therein. A suitable fuel inlet 29 and outlet 31 is provided and connected with the assembled collapsible tank 13 and supporting structure 18. The inlet 29 may be assembled in any leakproof manner to permit the filling of the tank 13, while novel means is provided for connecting the outlet 31 with the collapsible tank 13. The outlet 31 may comprise a tubular member 32 extending through adjacent lower surfaces of the inner end 17 of the supporting structure 18 and the cooperating part of the tank 13.

Located within the tank 13 is a tubular member 33 having an annular outwardly extending flange 34 adapted to conform with the associated contour of the inner surfaces of the tank 13. The tubular member 33 as well as the flange 34 is molded from material similar to that which the tank 13 is composed of. This material, of course, is impervious to fuel and will be later described. The flange 34 of the tubular member 33 is fixed to the associated inner surfaces of the tank 13 in a positive leakproof manner and in order to strengthen this particular portion of the associated mechanism, an additional strengthening piece 35 is applied to the associated outer surface of the tank 13, and the three elements, namely flange 34, tank 13, and strengthening piece 35 are preferably cemented as well as sewed into firm fixed relation. A suitable clamp 36 may be employed for clamping the tubular member 33 into a leakproof contact with the outer surfaces of the tubular member 32.

The drains 28 as well as the vents 27 are assembled in leakproof relation similar to that described in connection with the outlet 31. Each of the drains 28 and the vents 27 include a tubular member 37 and cooperating oppositely disposed tubular members 38 about the ends of the tubular members 37. Each of the tubular members 38 include integral flanges 39 formed to cooperate with the adjacent contour of the inner surfaces of tank 13.

In this construction the flanges 39 are fixed to the opposite sides of the split bulkheads 25 of the tank 13 preferably by gluing and sewing and also the lower portion of the flanges 39 are connected to the adjacent inner bottom surfaces of the tank 13. As here shown tank 13 is constructed to overlap as shown at 41 and the cooperating portion of flange 39 is sewed as well as glued to this flat portion 41 providing a rigid leakproof connection. Each of the tubular members 38 are connected to the cooperating end of tubular members 37 by means of suitable clamps 42.

The bulkheads 25 of the tank 13 are formed by initially constructing the several compartments of tank 13 separately. This provides a novel construction of the bulkheads 25 for receiving the bulkheads 22 in the supporting structure 18. This is effected by the construction of bulkheads 25 of the tank 13, which construction consists of adjacent bulkheads 43 of the adjacent compartments being connected together at the edges of the openings in the bulkheads 25 corresponding to the openings 23 in the bulkheads 22. The adjacent members 43 are preferably connected by a pair of annular overlapping members 44 adapted to receive the cooperating edges of the members 43 and are cemented and sewed in firm fixed relation one with the other to form a positive leakproof connection.

In addition to the support afforded by the drains 28 and the vents 27 of the tank 13 suitable hooks (see Figure 6) may be carried by the inner surfaces of the supporting structure 18 and adapted to engage a cooperating flap 46 carried by the adjacent surface of the tank 13.

Reinforcing means 47 are carried by the tank 13 and positioned to protect the tank from damage by any contact with or friction against the hooks 45. Another means may be provided for supporting the tank 13 within the structure 18 instead of the hooks 45 and flaps 46. This means is best illustrated in the left upper corner of Figure 4, wherein there is provided a lug or projection 56 molded from neoprene or a like composition. This lug 56 is provided with an integral flange 57 adapted to lie flush with the cooperating contour of the associated surface of the tank 13 and is fixed thereto in a similar manner to that described in connection with flanges 34 and 39 of the tubular members 33 and 38, respectively.

A suitable covering 48 for the manhole 21 as well as the cooperating opening 21' in the tank 13 is provided for connecting the associated surfaces of the tank 13 in leakproof relation with the covering and the cooperating bottom of the supporting structure 18. This covering 48 also constitutes an additional support for the collapsible tank 13 within the supporting structure 18 and as here shown the covering 48 comprises an inner and outer member 49 and 51, respectively, adapted to receive the cooperating portion of tank 13 and the bottom 16 of the supporting structure 18 and clamp them into rigid leakproof relation. This is accomplished by suitable detachable connections such as bolts 52 having positive lock nuts 53. The inner member 49 is annular in shape (see Figure 13) and is preferably provided with an additional reinforcing member 54 adapted to lie between the member 49 and the associated surfaces of the tank 13 so that the bolts 52 will operate to clamp the several cooperating members into rigid leakproof relation.

The inner tank is constructed of flexible material impervious to the liquid or gas that it is intended for use. This material may be of any suitable composition that will satisfactorily fill the office for which it is intended. As a preferred embodiment there is here employed a fabric treated with a compound known in the trade as neoprene. This compound may be described as a synthetic rubber product, as it is difficult to observe any physical difference. However, the present compound is distinguished by the fact that it is impervious as well as resistant to the deteriorating action of crude petroleum oils or fuel used in internal combustion engines. This compound when applied to a fabric provides a material that is not only impervious to the fluid for which it is intended to be used, but it is exceptionally light in weight, the latter being a major and vital factor in the present art. The fabric used in the construction of this collapsible tank may be treated with as many coats of this neoprene product as required for the particular installation for which the tank is intended. This neoprene product is possessed of the required strength and durability to withstand the strains for use to which the inner tank is subjected. The tubular member 33 of the outlet means as well as the tubular members 38 of the drains 28, vents 27, and reinforcing members 47, may be constructed of a much heavier neoprene product and the composition may be molded in the absence of any inner fabric.

The corners of the collapsible tank 13 are further reinforced by reinforcing members 48 (see Figure 7). The members 48 may be and preferably are constructed of the same product as the tank, although the thickness of the members 48 may be greater than the thickness of the tank 13 proper. These reinforcing members prevent the tank from giving away at the corners where the adjacent surfaces of the tank are positioned for contact with each other and subjected to additional friction and wear than the tank proper.

For the purpose of transferring the weight of the fuel within the collapsible tank 13 to the supporting structure 18, the inner tank is constructed so that its overall dimensions are greater than the corresponding inner dimensions of the supporting structure 18. This is an important feature of this invention and this feature provides a number of vital characteristics required to overcome the difficulties heretofore presented by previous fuel containing means. Some of these advantages are: In addition to transferring the load of the fuel to the supporting structure 18, the tank will readily expand or collapse due to differential air pressures. Also in case of a sudden impact such as a crash, this improved tank construction will not burst and throw gasoline or its contents over a large area, but instead it will at the worst merely tear and permit the fuel passing out through such opening to be more or less localized to the region of the tank.

Figure 5 illustrates another feature of the invention, wherein novel means is provided for positively preventing any seepage of the fuel by way of the seams and stitches employed in the construction of the collapsible tank. This means comprises impregnating the stitching with a neoprene or like composition and then in covering the seams and stitches with a strip or sheet 61 which is preferably made from a thin sheet of neoprene composition. This strip or sheet 61 is positioned on the inner side of the tank 13 and glued over the adjacent surfaces to the seams indicated at 62. By placing this strip 61 on the interior of the tank, the pressure or weight of the fuel operates to press the strip against the adjacent surfaces to the seams and augments the sealing of the seams against access to the fuel. This strip or sheet 61 may be employed wherever such seams 62 occur within the tank 13. These strips or sheets 61 may be made from neoprene composition or similar material with or without the use of an inner fabric.

Accordingly, there is provided an improved aircraft construction including a novel containing means that shall operate efficiently and to overcome the difficulties heretofore encountered with the previously proposed containing means.

While this invention has been illustrated and described in connection with a monoplane wing, it is to be distinctly understood that the principles here disclosed are equally adaptable for use with airplanes or flying boats or other types and that the containing means may be positioned at any desirable location within, on, or suspended from the aircraft structure. Other changes, modifications, substitutions, additions, and omissions may be made in the structure here illustrated without departing from the spirit and scope of the appended claims.

We claim:

1. A petroleum containing means including a rigid supporting enclosure and a collapsible enclosure positioned within said supporting enclosure, the outer dimensions of the said collapsible enclosure being greater than the inner dimensions of the said supporting enclosure.

2. An aircraft construction including a containing means, the said means comprising a rigid supporting structure having a collapsible tank positioned within the said structure, the said collapsible tank having a greater volumetric capacity than the said supporting structure.

3. In an aircraft, a structural portion having a reinforcing member arranged therein, said structure forming an enclosure, said reinforcing member having an aperture therethrough, and a hydrocarbon container formed of a pliant material impervious to gasoline arranged within said structure, said container lying on both sides of said reinforcing member and having a partition therein corresponding to said reinforcing member, and an opening in said partition corresponding to the opening in said reinforcing member to provide communication between portions of said container, said container having greater outer dimensions than the inner dimensions of said enclosure.

4. In an airplane having a wing, and having a reinforcing member extending transversely of said wing, said reinforcing member having an aperture therein, a hydrocarbon containing tank comprised of a pliant material impervious to gasoline having portions located on both sides of said reinforcing member and having a partition corresponding to said reinforcing member provided with an aperture corresponding to the aperture in said reinforcing member, said aperture providing communication between the portions of the tank on opposite sides of said reinforcing member.

5. In an aircraft, a liquid hydrocarbon container comprising a rigid framework and a collapsible container of a pliant material secured at a plurality of points within said framework and having its outer dimensions greater than the inner dimensions of said framework.

6. In an aircraft, a liquid hydrocarbon container comprising a rigid frame having a partition therein, said partition having an aperture therein, and a flexibile container impervious to liquid hydrocarbons within said frame having a two-ply partition therein provided with an aperture corresponding to said first aperture, the plies of said second partition lying on opposite sides of the first partition and being sealed together at the common aperture, said flexible container having greater outer dimensions than the inner dimensions of said frame.

7. In an aircraft, a liquid hydrocarbon container comprising a rigid frame having a partition therein, said partition having an aperture therein, and a flexible container impervious to liquid hydrocarbons within said frame having a two-ply partition therein provided with an aperture corresponding to said first aperture, the plies of said second partition lying on opposite sides of the first partition and being sealed together at the common aperture.

8. In a device as claimed in claim 7, means mounting said flexible container in said rigid frame including a vent passing through said partition.

9. A liquid hydrocarbon container for vehicles comprising a flexible container of pliant material impervious to liquid hydrocarbons and having a two-ply partition therein provided with an aperture and thereby dividing the container into communicating compartments, the plies of said partition being sealed together at the edge of said aperture and being otherwise separate, whereby said container may be mounted in a rigid partitioned frame forming part of a vehicle with said partition of the container enclosing a partition of the rigid frame.

REID B. GRAY.
EDWIN L. ZIVI.